May 14, 1935.　　　L. G. SMITH　　　2,001,116
BARBECUEING STOVE
Filed May 6, 1933　　　2 Sheets-Sheet 1
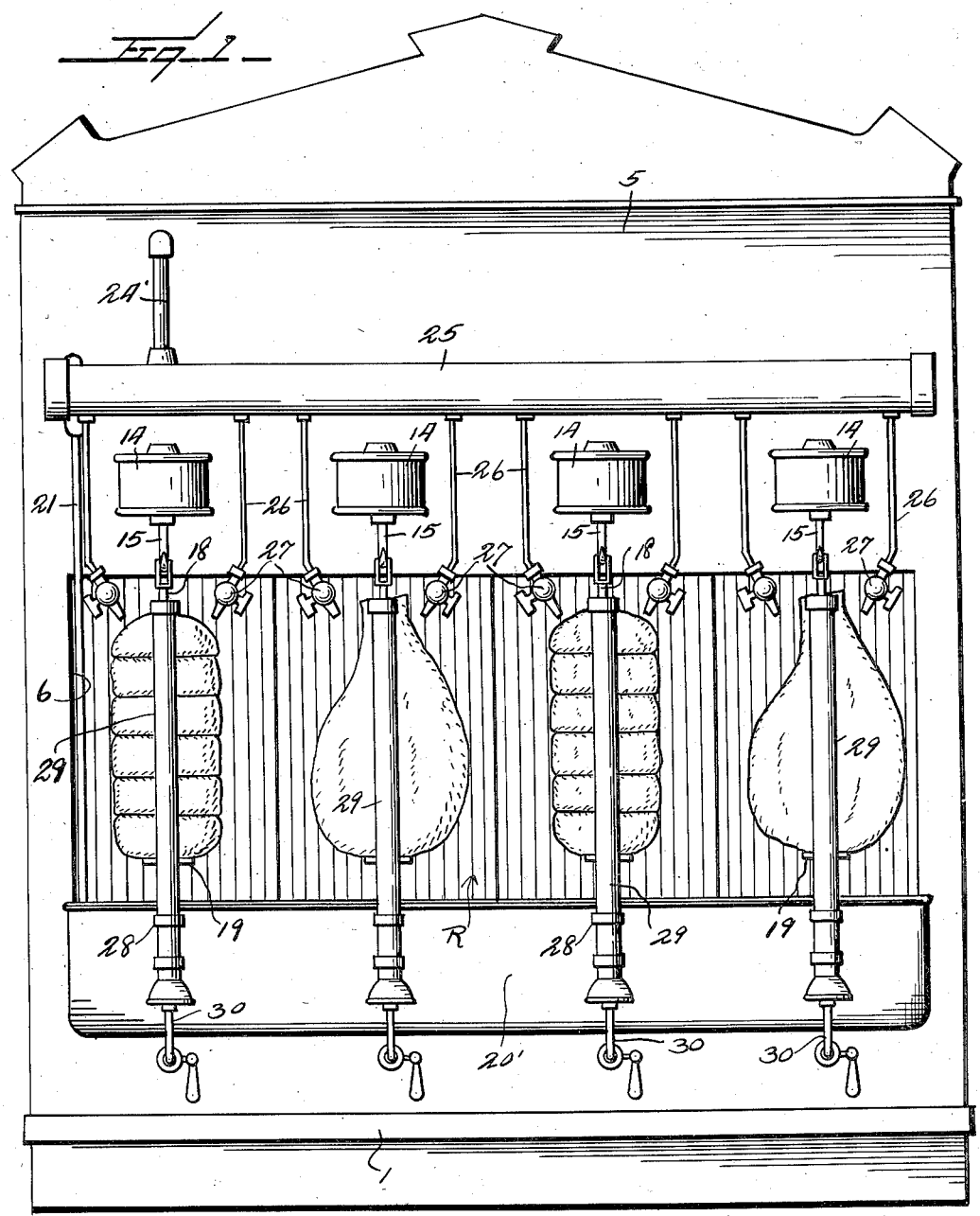

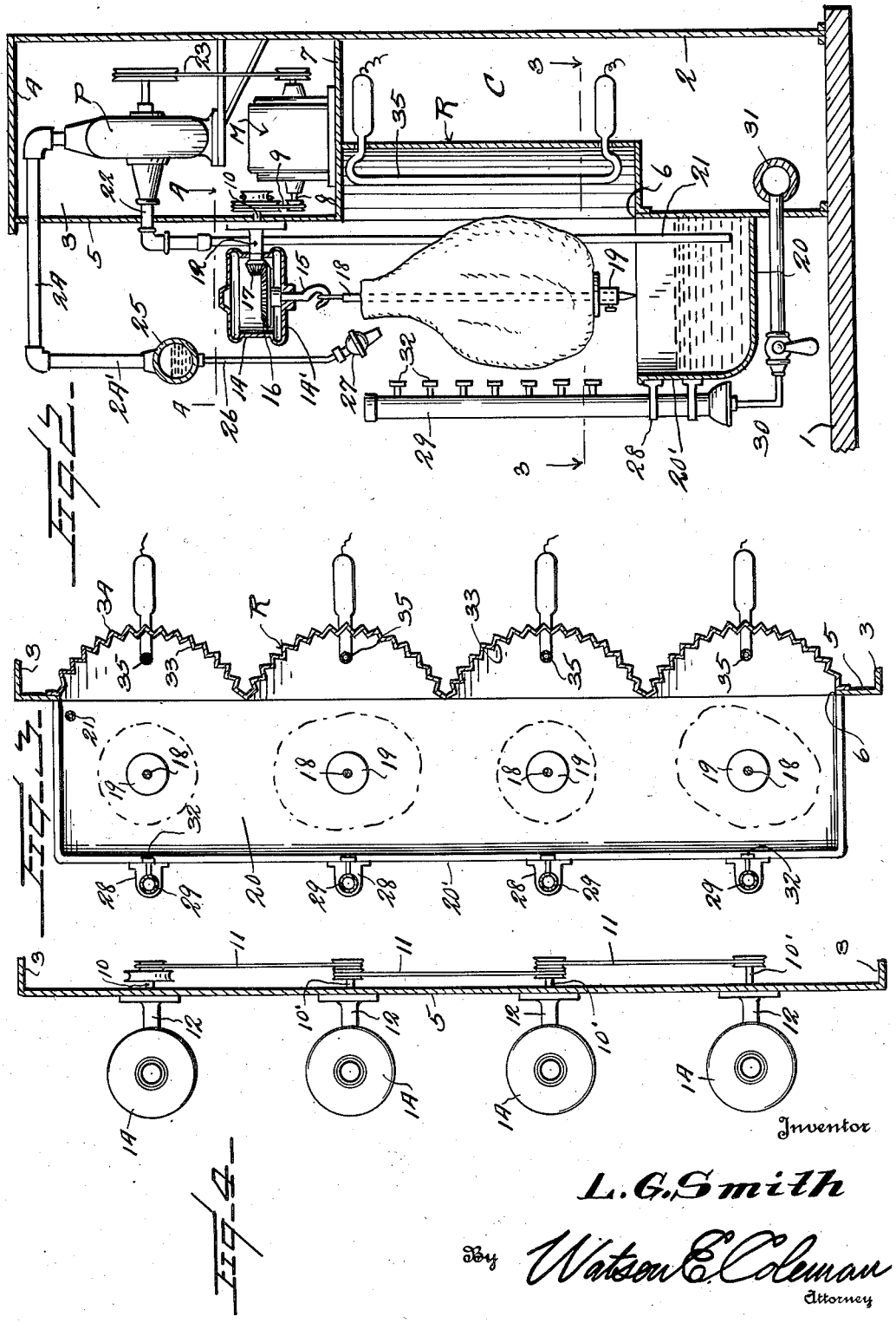

Patented May 14, 1935

2,001,116

UNITED STATES PATENT OFFICE 2,001,116

BARBECUING STOVE

Leonard G. Smith, Miami, Fla.

Application May 6, 1933, Serial No. 669,751

2 Claims. (Cl. 272—8)

This invention relates to cooking apparatus and has relation more particularly to that type of apparatus especially designed and adapted for use with what is generally known as barbecue cooking, and it is an object of the invention to provide a practical machine of this kind provided with means whereby an effective advertising display is obtained during the cooking of the meat and at other times.

It is a fact well recognized in the trade that the display value of a barbecuing apparatus is of equal value with the cooking efficiency of the apparatus. In apparatus for barbecuing meats used in display stands as made to-day, the display value of the apparatus has to be sacrificed during the time when the meat is being actually cooked. One of the objects of the present invention therefore is to provide a cooking apparatus for the barbecuing of meats or the like wherein a cooking or heating unit is disposed in front of the meat to be cooked, but is of such a character as not to obscure the meat in any way and to provide a reflector positioned rearwardly of the meat and approximately concentric thereto, there being an illuminating unit disposed between the meat and the reflector, entirely obscured by the meat, which will simulate a glowing fire either while the meat is being actually cooked or when the meat has been removed from the spit and a dummy piece of meat suspended therefrom.

Figure 1 is a view in front elevation of a stove barbecue cooker constructed in accordance with an embodiment of my invention;

Figure 2 is a transverse vertical sectional view taken through the structure as illustrated in Figure 1 with certain of the parts in elevation;

Figure 3 is a horizontal sectional view taken substantially on the line 3—3 of Figure 2 looking in the direction of the arrows;

Figure 4 is a fragmentary horizontal sectional view taken substantially on the line 4—4 of Figure 2 looking in the direction of the arrows.

As disclosed in the accompanying drawings, 1 denotes a counter or other desired support upon which my improved stove or apparatus is mounted. As herein set forth my improved barbecue cooker includes a casing comprising a back wall 2, side walls 3 and a top wall 4. The walls, 2, 3 and 4 provide a chamber C over the outer face of which is positioned a front wall 5 having its lower portion cut out, as at 6, to provide an opening extending a major distance across the front wall 5 and of a desired type. The upper portion of the chamber C is intersected by a horizontally disposed partition or shelf 7 and as particularly illustrated in Figure 2 this partition or shelf 7 is arranged adjacent to the upper edge of the cut out portion or opening 6.

This shelf 7 provides a support for a motor M, preferably an electric motor, and which has its drive shaft 8 extending beyond opposite sides thereof. One end portion of this shaft 8 is in driving connection through a belt 9 with a shaft 10 rotatably supported by the front wall 5 and extending a desired distance outwardly therefrom. This shaft 10 is in driving connection through the belts 11 with the additional shafts 10' also supported by the front wall 5 and extending outwardly therefrom. These shafts 10 and 10' are also preferably in substantially horizontal alignment.

Each of these shafts 10 and 10' is directed through an outstanding bearing sleeve 12 and supported by the outer portion of said sleeve 12 is a housing 14 of desired dimensions and design.

This housing 14 serves after the fashion of a bracket and the bottom wall 14' thereof provides a mounting for a depending hook member 15 adapted to be rotated at a desired speed through the intermeshing gear 16 and pinion 17. The gear 16 and pinion 17 are within the housing 14 with the gear 16 fixed to the upper end portion of the hook member 15 and the pinion 17 fixed to the shaft 10 or 10'. The speed of the motor M together with the ratio of the gear 16 to the pinion 17 are such as to cause the hooks 15 to rotate at a relatively low speed.

Each of the hooks 15 is adapted to have suspended therefrom a skewer 18 after the same has been passed through the central part of a ham or other piece of meat. The lower portion of the skewer 18 after being inserted through the meat has keyed thereon a holding sleeve 19 to prevent the meat from dropping from the skewer.

The front wall 5 below the cut out portion or opening 6 is provided with a forwardly disposed drip pan 20 of desired dimensions and which receives the drippings from the meat during a cooking operation. Extending within the pan 20 and terminating closely adjacent to the bottom thereof is a pipe line 21. This pipe line extends upwardly and into the upper part of the chamber C, as at 22, through the front wall 5 and is in communication with a pump P herein indicated as of a rotary type. This pump P is in driven connection through a belt 23 with the inner end portion of the shaft 8 of the motor M.

Leading from the pump P is a discharge pipe 24 which extends outwardly through the front wall 5 to a suitable point in advance thereof where it is continued by a depending portion 24' discharging within a horizontally disposed manifold 25. This manifold 25 is preferably of a diameter considerably in excess of the diameter of the bore of the discharge pipe 24 and serves to hold a supply of drippings as pumped from the pan 20 and which drippings are adapted to be used for basting the meat upon the skewers 18 during the cooking operation.

Depending from the manifold 25 at desired points therealong are delivery pipes 26 having their lower end portions provided with the valved nozzles 27 discharging inwardly upon the meat being cooked. As particularly illustrated in Figure 1, there are two delivery lines 26 associated with each hook 15 to assure effective basting of the meat suspended from the hook although of course I do not wish to be understood as limiting myself to this particular number.

The outer vertical wall 20' of the pan 20 has secured thereto by the holding brackets 28 or otherwise as may be preferred, the vertically disposed and straight manifolds 29 each in desired communication through a pipe line 30 with a source of gas supply 31 herein disclosed as a pipe adapted for suitable connection with the service gas main. A single manifold 29 is positioned in advance of but, as herein disclosed, below each of the hooks 15 with its upper end terminating in a horizontal plane closely adjacent to the horizontal plane of the lower end of the hook 15.

The manifold 29 has a series of burners 32 spaced lengthwise of the manifold 29 and disposed rearwardly thereof and discharging more particularly toward the meat or the like suspended from the hook member 15.

The cut out portion or opening 6 of the front wall 5 is closed by a reflector plate R. This plate is formed with vertically disposed corrugations 33 and is also formed to provide a series of substantially semi-circular reflectors 34 each of which being positioned rearwardly of and extending a relative distance beyond opposite sides of a hook member 15. These reflectors 34 assure an effective and attractive display during the periods the burners 32 are in use. However, it is highly important that the display value of the stove or machine be maintained during those periods when meats are not being cooked. For this purpose there is disposed centrally of each of the reflectors 34 a vertically disposed illuminating unit 35, preferably of a vapor type, and which unit 35 is of a character to give forth a red glow so that when the units 35 are in use the stove or apparatus will simulate a burning fireplace. During this time the cooked meats are preferably removed and in the place thereof skewers are suspended from the hook members 15 carrying dummy meats. It is to be particularly noted that the burner pipe 29 extends upwardly in front of the meat being cooked and discharges the gas flames toward the meat being cooked. The gas flames give very little glow such as is ordinarily associated with the use of live coals in barbecuing and the reflector R may be used with the illuminating unit 35 while the meat is being cooked as well as during the periods when the meat is not being cooked. The red glow from the illuminating unit 35 will be reflected outward toward the passerby and thus give an effect as if the meat were roasting before a bed of coals, tho as a matter of fact the meat is roasting by reason of the gas burners 32, and it will also be seen that the same effect is secured when a dummy piece of meat or other article is supported upon the hook 15 and is being rotated. This is important from the point of view of display and advertising, because it looks as though the barbecuing were constantly proceeding and the display is particularly effective at night where meat is actually being cooked by being rotated in front of the burners 32. The glow from the tube 35 is reflected forward on to the meat and brings out the color of the meat very strongly as well as giving the effect of a glowing fire so that the display is particularly enhanced.

I claim:—

1. In a visible cooking apparatus, means for suspending and rotating an article as if for cooking, a concavely curved reflector extending approximately the full length of the space occupied by the article, the reflector being approximately concentric to the axis of rotation of the article, and an illuminating means giving off a glow simulating the glow of hot coals and disposed between the supported object and the reflector and hidden by the object when the latter is so suspended.

2. In apparatus of the character described, means for suspending and simultaneously rotating an article as if for roasting, a concavely curved reflector extending vertically approximately the full length of the space occupied by the article when so suspended, said reflector being approximately concentric to the vertical axis of the article, illuminating means giving off a glow simulating the glow of hot coals and disposed in advance of the reflector and between the reflector and the space occupied by the artcle, the illuminating means extending vertically approximately the full height of the reflector.

LEONARD G. SMITH.